(12) United States Patent  (10) Patent No.: US 9,189,098 B2
Dionne et al.  (45) Date of Patent: Nov. 17, 2015

(54) SYSTEMS AND METHODS FOR SYNCING HAPTIC FEEDBACK CALLS

(71) Applicant: Immersion Corporation, San Jose, CA (US)

(72) Inventors: Jean-Francois Dionne, Outremont (CA); Henry da Costa, Montreal (CA); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 224 days.

(21) Appl. No.: 13/830,045

(22) Filed: Mar. 14, 2013

(65) Prior Publication Data

US 2014/0267069 A1  Sep. 18, 2014

(51) Int. Cl.
*G06F 3/041* (2006.01)
*G06F 3/01* (2006.01)

(52) U.S. Cl.
CPC ............. *G06F 3/0414* (2013.01); *G06F 3/016* (2013.01); *G06F 3/0416* (2013.01)

(58) Field of Classification Search
CPC ...... G06F 3/0414; G06F 3/0416; G06F 3/016
USPC ................................................ 345/156–173
See application file for complete search history.

(56) References Cited

U.S. PATENT DOCUMENTS

| | | | |
|---|---|---|---|
| 7,924,144 B2 | 4/2011 | Makinen et al. | |
| 7,982,588 B2 | 7/2011 | Makinen et al. | |
| 8,026,798 B2 | 9/2011 | Makinen et al. | |
| 8,462,125 B2 | 6/2013 | Birnbaum et al. | |
| 8,587,417 B2 | 11/2013 | Birnbaum et al. | |
| 8,638,301 B2 | 1/2014 | Birnbaum et al. | |
| 2008/0287147 A1* | 11/2008 | Grant et al. | ................... 455/466 |
| 2010/0017489 A1 | 1/2010 | Birnbaum et al. | |
| 2010/0017759 A1 | 1/2010 | Birnbaum et al. | |
| 2010/0085169 A1 | 4/2010 | Poupyrev et al. | |
| 2010/0214243 A1 | 8/2010 | Birnbaum et al. | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2012/0268412 A1 | 10/2012 | Cruz-Hernandez et al. | |
| 2013/0057509 A1 | 3/2013 | Cruz-Hernandez et al. | |
| 2014/0118127 A1 | 5/2014 | Levesque et al. | |
| 2014/0139448 A1 | 5/2014 | Levesque et al. | |
| 2014/0139450 A1 | 5/2014 | Levesque et al. | |
| 2014/0139451 A1 | 5/2014 | Levesque et al. | |
| 2014/0139452 A1 | 5/2014 | Levesque et al. | |
| 2014/0253302 A1 | 9/2014 | Levesque et al. | |
| 2015/0009168 A1 | 1/2015 | Dionne | |

OTHER PUBLICATIONS

Google I/O 2012—For Butter or Worse: Smoothing Out Performance in Android UIs, Published on Jun. 29, 2012, web page at htto://www.youtube.com/watch ?v=Q8m9sHdyXnE.

* cited by examiner

*Primary Examiner* — Rodney Amadiz
(74) *Attorney, Agent, or Firm* — Kilpatrick Townsend & Stockton LLP

(57) ABSTRACT

Systems and methods for syncing haptic feedback calls are disclosed. For example, one described method includes: receiving an input signal associated with a user interface event; determining a haptic feedback signal based at least in part on the input signal; and determining whether or not to output the haptic feedback signal to haptic output device based at least in part on a haptic feedback rate.

20 Claims, 4 Drawing Sheets

SYSTEMS AND METHODS FOR SYNCING HAPTIC FEEDBACK CALLS

FIELD OF THE INVENTION

The present invention generally relates to haptic feedback, and more particularly to systems and methods for syncing haptic feedback calls.

BACKGROUND

Haptic feedback can provide a conduit for electronic devices to communicate information to users. This conduit can be in addition to standard visual or auditory effects. The number of devices that include some form of haptic feedback has increased dramatically over the past several years. However, due to bandwidth limits on a device, some haptic effects may be delayed. This can lead to less compelling effects. Accordingly, there is a need for the systems and methods discussed herein.

SUMMARY

Embodiments of the present disclosure include systems and methods for syncing haptic feedback calls. In one embodiment, a method according to the present disclosure may comprise receiving an input signal associated with a user interface event; determining a haptic feedback signal based at least in part on the input signal; and determining whether or not to output the haptic feedback signal to a haptic output device based at least in part on a haptic feedback rate.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter

BRIEF DESCRIPTION OF THE DRAWINGS

These and other features, aspects, and advantages of the present disclosure are better understood when the following Detailed Description is read with reference to the accompanying drawings, wherein.

DETAILED DESCRIPTION

Figure 1:
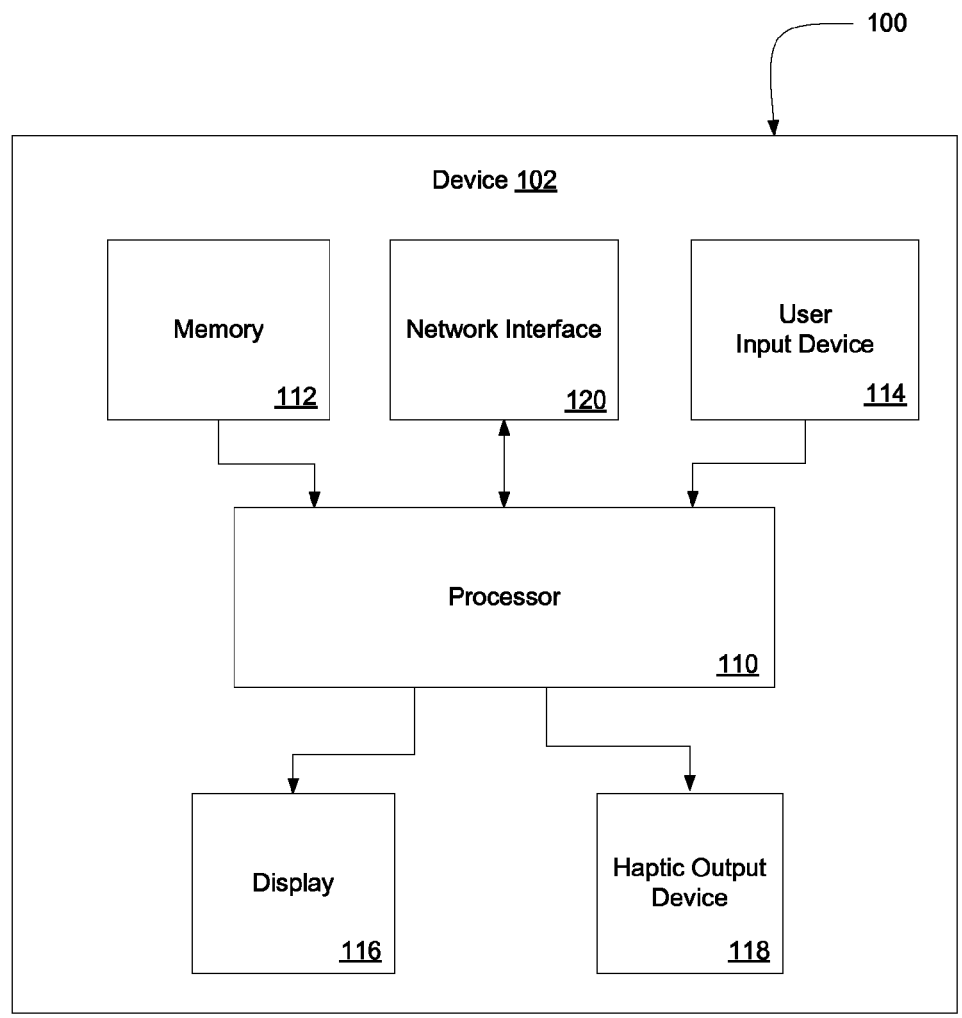
FIG. 1 is a block diagram of systems and methods for syncing haptic feedback calls according to one embodiment.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Illustrative Embodiment of Syncing Haptic Feedback Calls

One illustrative embodiment of the present disclosure comprises a device that has the capability to output haptic effects, for example, a smartphone comprising a haptic output device and a user interface through which the user feels haptic effects. In the illustrative embodiment, the device comprises a version of the Android® Operating System made available by Google, Inc. ("Android®"). In the illustrative embodiment, Android® outputs a VSync synchronization signal or pulse at an interval. In the illustrative embodiment, this interval may generally be about 60 Hz (a period of 16 ms), but in some embodiments, the frequency is variable depending on processor utilization or display resolution.

In the illustrative embodiment, display processing and output is scheduled based on the VSync signal. That is, the processing for each display frame is associated with a VSync pulse that is one or more pulses before that frame is to be displayed. Such scheduling enables all display processing to occur in advance of when the frame will be displayed. Completing the display processing in advance helps ensure the device outputs the frame on time, and also may avoid repeating the same frame or missing a frame during times of heavy processor utilization, sometimes referred to as "jank."

Further, in the illustrative embodiment, the operating system comprises one or more buffers to store frames in advance of when each frame will be displayed. In some embodiments, the operating system may comprise a double buffer (two buffers for storing two frames), a triple buffer (three buffers for storing three frames), or more buffers. In the illustrative embodiment, the number of buffers may be determined based at least in part on processor utilization. These buffers further enable the display signal to be output to a display at even intervals. This may lead to smoother image processing and higher overall display quality, particularly in instances where image processing takes more than 16 ms.

As previously mentioned, the illustrative embodiment further comprises one or more haptic output devices configured to output haptic effects. In the illustrative embodiment, the processor is configured to determine these haptic effects, and then determine whether and when to output the haptic effect. In the illustrative embodiment, the processor makes the determination to output a haptic effect based in part on the VSync signal. Thus, the haptic effect may be output only at the beginning of a VSync. Furthermore, the processor is configured to determine when to stop the haptic effect based in part on the VSync. For example, a haptic effect may be output for a period of three VSyncs.

Furthermore, in the illustrative embodiment, the processor may be configured to determine a haptic effect in advance of the VSync that triggers the haptic effect to be output. Further, in the illustrative embodiment, the operating system comprises a buffer to store haptic effects in advance of when the haptic effect will be output. In some embodiments, the operating system may include additional buffers. These buffers further enable the haptic effects to be output smoothly, particularly in instances where processing the haptic effect may take more than 16 ms.

Similarly, in the illustrative embodiment, the processor may be programmed to output haptic effects in an order, or within a time interval, so that each haptic effect will not interfere with, or run over top of another haptic effect. For example, in one embodiment, an actuator needs a certain period of time to accelerate in order to output a haptic effect. The total time during which the effect is output includes both the duration of the effect and the acceleration time. Thus, in the illustrative embodiment, the processor may be configured to determine whether a haptic effect will take a certain period of time to begin in addition to the duration of the effect itself. Furthermore, in the illustrative embodiment, the processor is configured to determine whether the haptic effect will take more than a certain period of time to stop, for example, because the actuator needs to decelerate. In the illustrative embodiment, the processor uses this calculation to determine a period of one or more VSync(s) that need to pass between each haptic effect.

Further, in the illustrative embodiment, the operating system may comprise programming configured to determine that the processor is too overloaded to process and output a haptic effect before the next effect is to be output. Thus, the operating system may be configured to determine to skip a particular haptic effect in order to ensure that the remaining haptic effects can be output smoothly at the appropriate time (e.g., at the appropriate point in a VSync signal). In some embodiments, this determination may be made based on one or more of a plurality of factors, for example, the priority of the haptic effect versus other haptic effects, the type of haptic output devices available, the current rate of VSync, the source of the input, or some other factor associated with the haptic effect.

These illustrative examples are given to introduce the reader to the general subject matter discussed herein. The invention is not limited to these examples. The following sections describe various additional embodiments and examples of systems and methods for syncing haptic feedback calls.

Systems for Syncing Haptic Feedback Calls

Referring now to the drawings in which like numerals indicate like elements throughout the several Figures, FIG. 1 is a block diagram of a system for syncing haptic feedback calls according to one embodiment of the disclosure.

The system 100 shown in FIG. 1 comprises a device 102. In some embodiments, device 102 may comprise one of a variety of handheld devices, such as a mobile phone, a personal digital assistant (PDA), or a handheld navigation system. Other embodiments may be implemented in an automobile console, an airplane console, a console for industrial equipment, a household appliance, a gaming console, or other electronic device.

Embodiments of the present disclosure can be implemented in combination with, or may comprise combinations of: digital electronic circuitry, computer hardware, firmware, and software. The device 102 shown in FIG. 1 comprises a processor 110. The processor 110 receives input signals and generates signals for communication, display, and haptic feedback. The processor 110 includes or is in communication with one or more computer-readable media, such as memory 112, which may comprise random access memory (RAM).

The processor 110 executes computer-executable program instructions stored in memory 112, such as executing one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 112 comprises a computer-readable media that may store instructions, which, when executed by the processor 110, cause it to perform various steps, such as those described herein. Embodiments of computer-readable media may comprise, but are not limited to, an electronic, optical, magnetic, or other storage or transmission device capable of providing the processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor 110, and the processing, described may be in one or more structures, and may be dispersed throughout one or more structures.

Further, in some embodiments, memory 112 further comprises a buffer configured to store haptic signals after the processor 110 determines the haptic effect. In some embodiments, this may be a double buffer (capable of storing two haptic effects) or a triple buffer (capable of storing three haptic effects). In further embodiments, the buffer may be able to store more haptic effects. In still other embodiments, the buffer may comprise one or more predetermined types of effects, and thus may comprise a haptic lookup table of effects, each of which can be output.

Referring still to FIG. 1, the device 102 also comprises a user input device 114 in communication with the processor 110. For example, in some embodiments the user input device 114 may comprise a touchscreen. In such an embodiment, user input device 114 may sense user interaction as well as the location of the interaction. One such embodiment comprises a capacitance-based touchscreen. In other embodiments, user input device 114 may comprise a keyboard, one or more buttons or switches, a slider, a knob, touchpad, or a trackball. In still other embodiments, the device 102 may comprise both a touch screen and one or more additional user input device(s) 114.

The device 102 also comprises a display 116. Display 116 is in communication with processor 110 and is configured to display output from the processor 110 to the user. For instance, in one embodiment, the device 102 comprises a liquid crystal display (LCD) disposed beneath the user input device 114. In some embodiments, the display 116 and user input device 114 may comprise a single, integrated component, such as a touch-screen LCD. In some embodiments, device 102 may not comprise a display.

The device 102 also comprises a haptic output device 118, which is in communication with the processor 110 and configured to output a haptic effect. After the processor 110 determines a haptic effect, it sends a haptic signal to haptic output device 118. The haptic signal is configured to cause haptic output device 118 to output the determined haptic effect. Haptic output device 118 may be, for example, an actuator such as a piezoelectric actuator, an electric motor, an electro-magnetic actuator, a voice coil, a linear resonant actuator, a shape memory alloy, an electro-active polymer, a solenoid, an eccentric rotating mass motor (ERM) or a linear resonant actuator (LRA). In another embodiment, haptic output device 118 may comprise one or more electrostatic actuators, or an actuator configured to modify or deform the shape of a component of device 102.

In some embodiments, in response to a haptic signal received from processor 110, haptic output device 118 is configured to output a haptic effect varying a coefficient of friction of a touch surface. Additionally or alternatively, haptic output device 118 may provide vibrotactile or kinesthetic haptic effects that move user input device 114, or other component of device 102, in a controlled manner. In another embodiment, haptic output device 118 may comprise one or actuators configured to modify or deform the shape of one or more components of device 102, e.g., the shape of one or more user input device(s) 114.

Although a single haptic output device 118 is shown in FIG. 1, some embodiments may use multiple haptic output devices of varying types to output haptic effects. For example, in one embodiment, a piezoelectric actuator is used to displace some or all of a touch surface vertically and/or horizontally at ultrasonic frequencies, such as by using an actuator moving at frequencies greater than 20 kHz. Further, in such an embodiment, one or more additional actuators such as eccentric rotating mass motors and linear resonant actuators can be used alone or in concert to provide different textures and other haptic effects.

The processor 110 is in communication with the network interface 120. The network interface 120 may comprise one or more systems or methods for mobile communication, such as Bluetooth, infrared, radio, Wi-Fi, or cellular network communication. In other variations, the network interface 120 comprises a wired network interface, such as Ethernet. The device 102 can be configured to exchange messages or virtual message objects with other devices (not shown) over networks, such as a cellular phone network and/or the Internet. Embodiments of messages exchanged between devices may comprise voice messages, text messages, data messages, or other forms of digital messages.

Figure 2A:
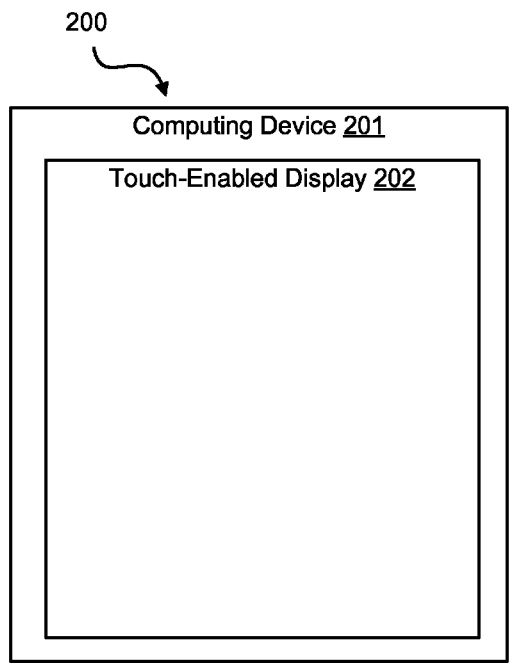
FIG. 2A is an illustration of one embodiment of a system for syncing haptic feedback calls.
Figure 2B:
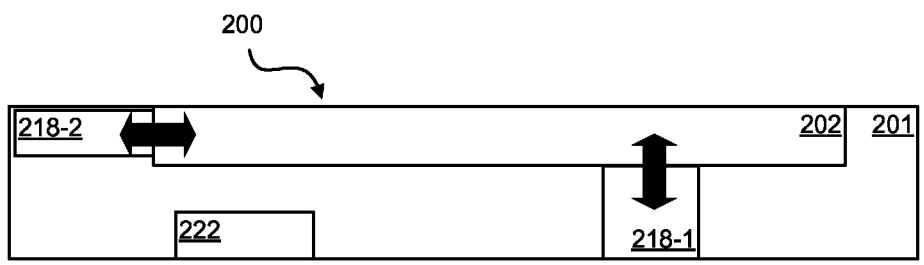
FIG. 2B is an illustration of one embodiment of a system for syncing haptic feedback calls.

Turning now to FIGS. 2A-2B, which illustrate an example of a system for syncing haptic feedback calls. FIG. 2A is a diagram illustrating an external view of a system 200 comprising a computing device 201 that comprises a touch-enabled display 202. A user may interact with touch enabled display 202, for example, by swiping his or her finger across the surface of touch enabled display 202 to interact with one or more images on display 202. And in response to the user interaction, one or more of the haptic output devices may output a haptic effect.

FIG. 2B shows a cross-sectional view of device 201. Device 201 may be configured similarly to device 102 described above with regard to FIG. 1, though components such as the processor, memory, sensors, and the like are not shown in this view for purposes of clarity.

As can be seen in FIG. 2B, device 201 includes a plurality of haptic output devices 218 and an additional haptic output device 222. Haptic output devices 218-1 may comprise an actuator configured to impart vertical force to display 202, while 218-2 may move display 202 laterally. In this example, the haptic output devices are coupled directly to the display, but it should be understood that the actuators could be coupled to another touch surface, such as a layer of material on top of display 202. Additional haptic output device 222 may be coupled to a housing containing the components of device 201. In the examples of FIGS. 2A-2B, the area of display 202 corresponds to the touch area, though the principles could be applied to a touch surface completely separate from the display, such as a touchpad used for providing input to the processor.

In one embodiment, haptic output devices 218-1 and 218-2 each comprise a piezoelectric actuator, while additional actuator 222 comprises an eccentric rotating mass motor, a linear resonant actuator, or another piezoelectric actuator. Actuator 222 can be configured to provide a vibrotactile haptic effect in response to a haptic signal from the processor. The vibrotactile haptic effect can be utilized in conjunction with surface-based haptic effects and/or for other purposes.

In some embodiments, either or both haptic output devices 218-1 and 218-2 can comprise an actuator such as a piezoelectric actuator. In another embodiment, haptic output devices 218-1 and 218-2 may comprise an electromagnetic actuator, an electroactive polymer, a shape memory alloy, a flexible composite piezo actuator (e.g., an actuator comprising a flexible material), electrostatic, and/or magnetostrictive actuators, for example. Additionally, a single additional haptic output device 222 is shown, although multiple other haptic output devices can be coupled to the housing of device 201 and/or other actuators 222 may be coupled elsewhere. Device 201 may feature multiple haptic output devices 218-1/218-2 coupled to the touch surface at different locations, as well.

In some embodiments, not shown in FIG. 2, device 200 may further comprise an array of multiple haptic output devices. For example, in one embodiment, device 200 may comprise an array of actuators associated with a touchscreen. In one embodiment, this array may comprise a 100×100 grid of actuators, each of which is configured to output one or more haptic effects, either independently or in concert. In such an embodiment, the systems and methods discussed herein may be used by a processor to determine haptic signals, and timing for haptic signals, to be output to each haptic output device.

Illustrative Systems for Syncing Haptic Feedback Calls

Figure 3A:
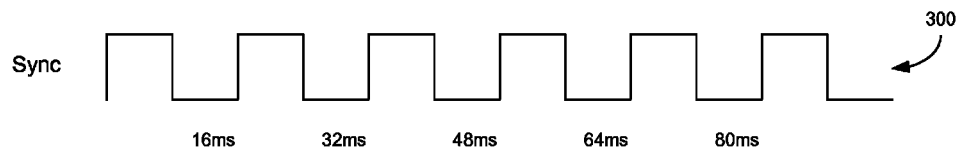
FIG. 3A is an illustration of a timing diagram according to one embodiment of a system for syncing haptic feedback calls.
Figure 3B:
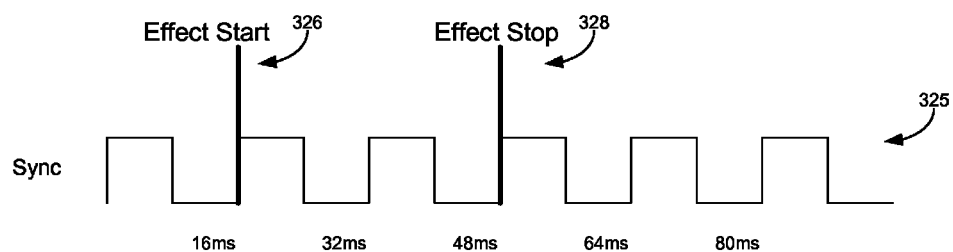
FIG. 3B is another illustration of a timing diagram according to one embodiment of a system for syncing haptic feedback calls.

Turning now to FIGS. 3A-3B, FIG. 3A comprises a Sync signal 300, which is shown as a periodic square wave with a period of 16 ms (60 Hz). In some embodiments this signal may comprise a VSync signal of the Android® operating system, as discussed above. In other embodiments, this signal may comprise a different frequency or shape signal. For example, with regard to shape, in some embodiments, the Sync signal may comprise a sine wave, a sawtooth wave, or some other wave. With regard to frequency, in some embodiments, the Sync signal may comprise a higher (e.g., 120 Hz) or lower frequency (e.g., 30 Hz). Similarly, in some embodiments, the Sync signal may comprise a variable frequency. For example, in one embodiment, the Sync signal may comprise a relatively higher frequency (e.g., 90 Hz) when the processor is at a low rate of utilization, and is therefore able to quickly determine a haptic effect. Further, in such an embodiment, the Sync signal may comprise a relatively lower frequency (e.g., 45 Hz) when the processor is at a relatively higher rate of utilization and therefore will not be able to quickly determine a haptic effect. Further, in some embodiments, the frequency of the Sync signal may be varied based on a plurality of factors, for example, one or more of: the current processor utilization, user selection, available hardware on the device, types of haptic output devices available, current speed of network connectivity or the rate of a file download or upload, a file currently played by a media player, a resolution or frame rate of the display 116, or some other characteristic.

In some embodiments, the Sync signal may be generated by an internal component of the processor. In other embodiments, the Sync signal may be generated by another circuit that is external to the processor or the device. For example, the signal may be generated by a signal generation circuit, such as a crystal oscillator. Further, in some embodiments, this signal generation circuit may be configured to vary the frequency of the Sync signal as discussed above.

In some embodiments, the Sync signal may comprise a signal associated with the maximum frequency at which different haptic effects may be output. As discussed above, this maximum may vary up or down based upon system load (e.g., the current utilization of processor 110 or the currently available haptic output device 118). Similarly, in some embodiments, the maximum rate may be defined by the currently available bandwidth of a network connection, for example, network connection 120. Thus, for example, the rate of haptic effects may be associated with the rate of data transferred. For example, in one embodiment, data may be transmitted to a remote haptic feedback device. In another embodiment, the received data may be associated with a streamed media file comprising a haptic component.

Further, in some embodiments, this rate may be associated with a media player. For example, in one embodiment, the haptic effect may be associated with the output of a media player. Thus, in some embodiments the haptic feedback rate may be associated with the current frame rate of a displayed video file. Further, in some embodiments, the haptic feedback rate could be set to a fixed maximum. Thus, for example, when the user scrolls through a list at faster than the maximum rate, the device may not attempt to output haptic effects at faster than a certain rate.

Turning now to FIG. 3B, FIG. 3B comprises a Sync signal 325, which may comprise a Sync signal of the type discussed above with regard to FIG. 3A. As shown in FIG. 3B, Sync signal 325 further shows an effect start time 326 and effect end time 328. In the embodiment shown in FIG. 3B, a processor may determine to output a haptic effect, for example, based on user input.

The processor may determine the haptic effect during the first period of the Sync signal, e.g., the period from 0 ms to 16 ms. Then, at the rise of the next period in the Sync signal, e.g., at 16 ms, the processor starts the haptic effect 326. Further, as shown in FIG. 3B, the haptic effect lasts for a length of the period of two Sync signal pulses, e.g., 32 ms. After that period, the haptic effect ends on the rise time of the next Sync pulse.

In some embodiments, haptic effects may start or stop at other periods associated with a Sync signal, e.g., at the midpoint or fall time of the Sync signal. Similarly, in some embodiments, haptic effects may last for a period that is less than a full Sync signal or is not an even multiple of a period of the Sync signal.

In some embodiments, the processor may be programmed to output haptic effects only at a time such that they will not interfere with, or run over top of, another haptic effect. Thus, in some embodiments, the processor may be configured to determine how long it will take to start outputting a haptic effect (e.g., the time to accelerate a haptic output device) and also the time it will take to stop outputting the haptic effect (e.g., the time for the haptic output device to decelerate).

Figure 3C:
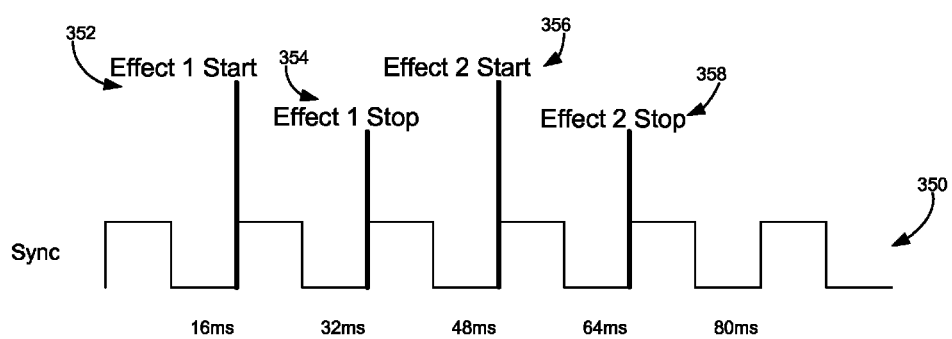
FIG. 3C is yet another illustration of a timing diagram according to one embodiment of a system for syncing haptic feedback calls.

Turning now to FIG. 3C, FIG. 3C comprises a Sync signal 350. Sync signal 350 may comprise a Sync signal of the type discussed above with regard to FIG. 3A. As shown in FIG. 3C, Sync signal 325 further shows a first haptic effect start time 352 and a first haptic effect end time 354. Further, after the end time of the first haptic effect 354, is a second haptic effect start time 356 followed by a second haptic effect end time 358.

In the embodiment shown in FIG. 3C, the processor may determine that the first haptic effect and second haptic effect would run together without sufficient separation between the two effects. This could lead to a less desirable effect, or cause one of the effects to be overwhelmed by the other, e.g., if one of the two effects is more perceptible than the other. For example, in one embodiment, the first haptic effect may comprise a low frequency, high amplitude vibration, while the second haptic effect may comprise an electrostatic effect. To avoid the electrostatic haptic effect being overwhelmed by the vibration effect, the processor may determine that at least one period of the Sync signal should pass between the end of the first haptic effect and the start of the second haptic effect. In other embodiments, the processor may determine a different length of time to place between the two effects. In some embodiments, the processor may make this determination, for example, based on the frequency of the effects, the amplitude of the effects, the type of effects, the haptic output device that outputs each effect, or some other factor associated with one or more of the haptic effects.

Further, in the embodiment shown in FIG. 3C, the processor may determine the first haptic effect during the first period of the Sync signal, e.g., the period from 0 ms to 16 ms. Then, at the rise of the next period in the Sync signal, e.g., at 16 ms, the processor starts the haptic effect 352. If the time to determine the haptic effect took less than 16 ms, the processor may store the haptic effect in a buffer, for example, a buffer stored in memory 112 described with regard to FIG. 1. Further, after determining the first haptic effect, the processor may determine the haptic signal associated with the second haptic effect. Again, after determining the second haptic effect, the processor may store the second haptic effect in a buffer prior to outputting the second haptic effect. Similarly, in some embodiments, the processor may be configured to determine a plurality of haptic effects in advance of when the signal associated with the effect is to be output. In such an embodiment, each of the plurality of haptic effects may be stored in a buffer, thus enabling the haptic effect to be output immediately, and without delay for processing, upon the triggering Sync signal (e.g., the rise or fall of a certain period of the Sync signal).

Further, in some embodiments, the processor may determine a priority of one or more haptic effects, and based on that priority, determine not to output an effect or change the order of the current effects. In some embodiments, the priority of the effect may be determined, or in other embodiments, the priority of the haptic effect may be included in the call for that haptic effect. For example, in one embodiment, the processor may determine that a certain haptic effect has a very low priority, and would likely interfere with another haptic effect of a higher priority. Thus, in some embodiments, the processor may determine not to output the lower priority haptic effect. Similarly, in one embodiment, the processor may determine that a haptic effect has a very high priority, and another effect has a lower priority and will interfere with the high priority effect. In such an embodiment, the processor may stop the current lower priority effect and output the high priority effect.

In some embodiments, the processor may determine that a haptic effect should be skipped. For example, in some embodiments, the processor may determine that two effects may be substantially identical. For example, haptic effects resulting from scrolling a list quickly. In some embodiments, the processor may determine that one or more of these effects can be ignored such that only one of these effects is output within a given time slot (e.g., within a period of the Sync signal). Similarly, in some embodiments, effects that are similar, but not identical, may be omitted, ignored, or combined with another effect. In some embodiments, the similarity of two or more haptic effects may be determined based in part on parameters such as duration, magnitude, repetition rate, envelope, or pattern associated with the effects. Furthermore, in some embodiments, the similarity of haptic effects may be determined based at least in part on a perceptual model. In some embodiments, this perceptual model may comprise a determination of how different two or more effects may feel to a human. For example, in some embodiments, a short strong effect may not feel similar to a longer weaker effect. Furthermore, in some embodiments there may be conditions where it is desirable to ignore all effects during a time slot; for example, when the processor is under a particularly heavy load.

In some embodiments, the processor may determine an alternate haptic effect. For example, the processor may make this determination because there is insufficient time to determine and output the haptic effect before the next haptic effect. Thus, in some embodiments, the processor may determine a simpler or shorter haptic effect that can be output in place of the haptic effect. In some embodiments, this may comprise determining another haptic effect that is stored in a buffer should be output instead of the current effect. In still another embodiment, the processor may determine that the effect should not be output because it will interfere with another haptic effect that may comprise a higher priority than the current effect. In still another embodiment, the processor may determine to delay one or more haptic effects that are of a lower priority so the current haptic effect may be output.

Illustrative Method for Syncing Haptic Feedback Calls

Figure 4:
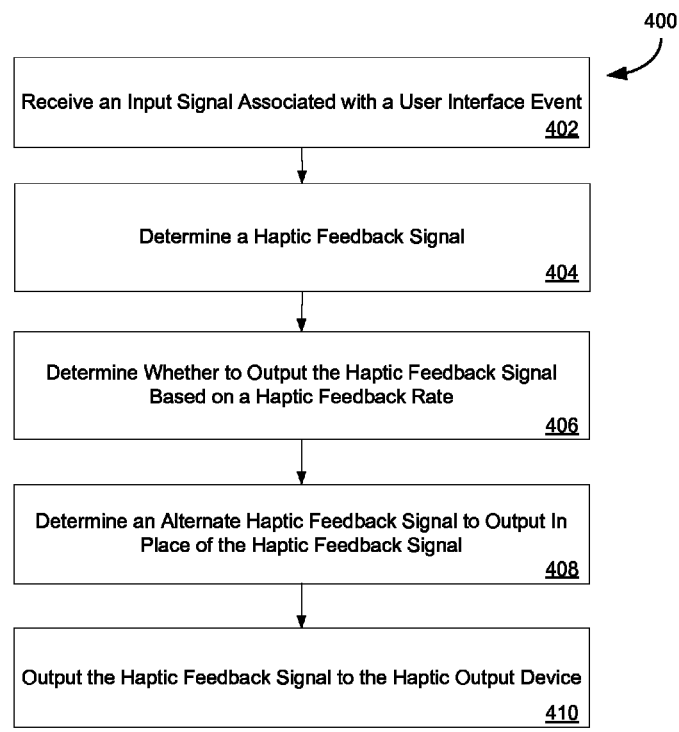
FIG. 4 is an illustration of a flow chart of one embodiment of a method for syncing haptic feedback calls.

Referring now to FIG. 4, FIG. 4 is a flow chart describing an exemplary embodiment for a method for syncing haptic feedback calls. In some embodiments, the stages in FIG. 4 may be implemented in program code that is executed by a processor, for example, the processor in a general purpose computer, a mobile device, or server. In some embodiments, these stages may be implemented by a group of processors, for example, a processor on a mobile device and processors on one or more general purpose computers, such as servers. Further, although the operations shown in FIG. 4 are described as a sequential process, many of the operations can be performed in parallel or concurrently. In addition, the order of the operations may be rearranged. Similarly, the process shown in FIG. 4 may comprise additional steps not included in FIG. 4. The stages below are described with regard to the components of device 102 described with regard to FIG. 1.

As shown in FIG. 4, the method 400 begins when processor 110 receives an input signal associated with a user interface event. In some embodiments, the input signal may comprise a signal associated with user input, for example, user input associated with user input device 114. In some embodiments, this input may comprise user input with a touch screen display, for example, user input with an interface displayed on a touch screen display. In other embodiments, the input signal may comprise a signal received from network interface 120. For example, in one embodiment, the input signal may comprise a signal received from a remote device. For example, in one embodiment, the signal may comprise a telephone call, a voicemail, an email, a text message, a weather alert, a news alert, or some other type of message received from another device. In still another embodiment, the user interface event may comprise an event associated with an operation of processor 110. For example, in one embodiment, the user interface event may be associated with a media file, such as an audio or video file, played by processor 110. In still other embodiments, the user interface event may comprise an event associated with an application, such as a game, news, media, or network application, executed by processor 110. In still another embodiment, the input signal may comprise an internally generated signal. For example, in one embodiment, the input signal may comprise a signal associated with device 102's operation, for example, it's current battery level, a temperature warning, a timer based alarm, or some other warning associated with the operation of device 102.

The method 400 continues when processor 110 determines a haptic feedback signal 404. The processor may rely on programming contained in a memory module of memory 112 to determine the haptic effect. For example, the processor 110 may access drive signals stored in memory 112 and associated with particular haptic effects. As another example, a signal may be generated by accessing a stored algorithm and inputting parameters associated with an effect. For example, an algorithm may output data for use in generating a drive signal based on amplitude and frequency parameters.

The method 400 continues when processor 110 determines whether to output the haptic signal based in part on a haptic feedback rate 406. In some embodiments, this may comprise determining the current point on a synchronization signal, such as VSync in the Android® operating system. For example, in one embodiment, the processor 110 may determine whether the haptic effect should be output during the current period of the Sync signal (e.g., at the next rise or fall of the Sync signal). Further, the processor 110 may not output haptic effects at a time (e.g., during a period of a Sync signal) such that one haptic effect may interfere with, or run over top of, another haptic effect. Thus, the processor 110 may be configured to determine whether a haptic effect will take a certain period of time to start, for example, because the haptic output device needs to accelerate. Furthermore, the processor may be configured to determine whether the haptic effect will take more than a certain period of time to stop, for example, because the haptic output device needs to decelerate. In some embodiments, the processor 110 may use this calculation to determine a period of one or more Sync signals that need to pass between each haptic effect.

In some embodiments, determining whether to output the haptic effect may comprise a determination associated with the current processor utilization. For example, in some embodiments, processor 110 may determine whether or not to output a haptic effect based on its current rate of utilization. In another embodiment, the haptic feedback rate may comprise a variable frequency. For example, in one embodiment, the haptic feedback rate may comprise a relatively higher frequency (e.g., 90 Hz) when the processor 110 is at a low rate of utilization, and is therefore able to quickly determine a haptic effect. Further, in such an embodiment, the haptic feedback rate may comprise a relatively lower frequency (e.g., 45 Hz) when the processor 110's utilization is high and therefore processor 110 cannot quickly determine a haptic effect. Further, in some embodiments, the haptic feedback rate may vary based on a plurality of factors, for example, one or more of: the current processor utilization, user selection, available hardware on the device, types of actuators on the device, or some other characteristic.

Further, in some embodiments, determining whether to output the haptic effect may comprise determining the priority of the haptic effect. In some embodiments, this may comprise determining the priority of other haptic effects. For example, one or more haptic effects that processor 110 has scheduled to be output compared to the priority of the current effect. For example, in one embodiment, the processor 110 may determine that a certain effect has a very low priority, and would likely interfere with another haptic effect of a higher priority. Thus, in some embodiments, the processor 110 may determine not to output the lower priority haptic effect. Similarly, in one embodiment, processor 110 may determine that a haptic effect has a very high priority, and another effect, has a lower priority and will interfere with the high priority effect. In such an embodiment, processor 110 may stop the lower priority effect, and output the high priority effect. Similarly, in some embodiments, the processor 110 may make a similar determination when processor 110 receives a plurality of haptic effects scheduled to be output at the same time.

In some embodiments, the priority of haptic effects may be determined based in part on one or more of, the actuator that outputs the haptic effect, an input associated with the haptic effect (e.g., a message, a phone call, an email, a user interaction, or a device warning such as a low batter alert), the length of the haptic effect, the frequency or amplitude of the haptic effect, whether the device is currently in use, or an assignment of priority by the user.

The method 400 continues when processor 110 determines an alternate haptic feedback signal to output in place of the haptic feedback signal 408. In some embodiments, the processor 110 may determine an alternate haptic effect because there is insufficient time to determine and output the haptic effect before the next haptic effect. Thus, in some embodiments, the processor 110 may determine a simpler or shorter haptic effect that can be output in place of the haptic effect. In some embodiments, this may comprise determining to output another haptic effect stored in a buffer, e.g., a buffer in memory 112, instead of the current effect. In still another embodiment, the processor 110 may determine not to output the haptic effect because the haptic effect may interfere with another haptic effect. In still another embodiment, the processor may determine to delay one or more haptic effects of a lower priority, and instead output the current haptic effect.

The method 400 continues when processor 110 outputs the haptic feedback signal to a haptic output device. As discussed above, in some embodiments haptic output device 118 may comprise traditional actuators such as piezoelectric actuators or electric motors coupled to touch surface 116 or other components within device 102. In other embodiments haptic output device 118 may comprise one or more electrostatic actuators configured to simulate textures or vary the perceived coefficient of friction on a surface using electrostatic fields. Further, in some embodiments, the haptic effect may be associated with one or more of a plurality of available textures. For example, the plurality of textures may comprise one or more of the textures of: water, grass, ice, metal, sand, gravel, brick, fur, leather, skin, fabric, rubber, leaves, or any other available texture, for example, a texture associated with explosions or fire. In still other embodiments, the haptic effect may comprise a haptic effect configured to vary the coefficient of friction felt by a user interacting with a touch surface of device 102 (e.g., a surface of a touch screen display). In such an embodiment, the haptic effect may comprise an effect output by an electrostatic actuator, or an ultrasonic vibration output by an actuator.

In one embodiment, processor 110 may output a haptic signal comprising haptic data to be decoded by the haptic output device 118. For instance, the haptic output device 118 may itself respond to commands specifying parameters such as amplitude and frequency. Further, in some embodiments, the processor 110 may output a signal to a buffer, e.g., a buffer in memory 112 that then outputs the haptic signal to the haptic output device 118.

Advantages of Various Embodiments of the Present Disclosure

Embodiments of the present disclosure provide numerous advantages over conventional methods for outputting haptic effects. For example, one advantage is that haptic effects can be output "smoothly" because they may be determined, scheduled, and buffered in such a way that each effect can be felt distinctly. This may lead to greater user satisfaction, as haptic effects will be more usable if they are output in a way that prevents one haptic effect from interfering with another effect.

Similarly, in embodiments of the present disclosure haptic effects of a higher priority may be output before or in place of other lower priority effects. In some embodiments, this may enable haptic effects to be more usable, as the most important haptic effect (e.g., a meeting reminder) will not be dulled by a less important haptic effect (e.g., a news alert from an application that the user rarely looks at).

Further, embodiments of the present disclosure may cause devices with haptic capability to operate more efficiently, as haptic effects can be determined in advance and buffered, potentially reducing processor utilization at certain times. Moreover, some embodiments of the present disclosure may use a signal that the device is already using for synchronization, e.g., a VSync signal.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A method for providing haptic feedback comprising:
   receiving an input signal associated with a user interface event;
   determining a haptic feedback signal based at least in part on the input signal; and
   determining whether to output the haptic feedback signal to a haptic output device based at least in part on a haptic feedback rate, wherein the haptic feedback rate comprises a periodic synchronization signal.

2. The method of claim 1, further comprising outputting the haptic feedback signal to the haptic output device.

3. The method of claim 1, wherein the user interface event is associated with a user interaction with a touch-sensitive display.

4. The method of claim 1, wherein the user interface event is associated with a change in a user interface.

5. The method of claim 1, wherein the user interface event is associated with receiving a message.

6. The method of claim 1, further comprising determining an alternate haptic feedback signal to output in place of the haptic feedback signal.

7. The method of claim 1, wherein the haptic feedback signal comprises a first haptic feedback signal and further comprising prioritizing a second haptic feedback signal over the first haptic feedback signal.

8. The method of claim 1, wherein the haptic feedback signal comprises a first haptic feedback signal and wherein determining whether to output the haptic feedback signal to a haptic output device comprises:
   determining a second haptic feedback signal associated with the first haptic feedback signal; and
   outputting the second haptic feedback signal to the haptic output device.

9. The method of claim 1, wherein the haptic feedback rate further comprises one or more of: a VSync rate, an audio sampling rate, a determination based at least in part on a measure of CPU utilization, a determination based at least in part on a timer, a determination based at least in part on a data transfer rate, and a determination based at least in part on the resolution of the display.

10. An electronic device comprising:
    a display configured to display a user interface;
    a haptic output device configured to receive a haptic signal and output a haptic effect; and
    a processor in communication with the display and the haptic output device and configured to:
      receive an input signal associated with a user interface event;
      determine a haptic feedback signal based at least in part on the input signal; and
      determine whether to output the haptic feedback signal to the haptic output device based at least in part on a haptic feedback rate, wherein the haptic feedback rate comprises a periodic synchronization signal.

11. The electronic device of claim 10, wherein the processor is further configured to output the haptic feedback signal to the haptic output device.

12. The electronic device of claim 10, wherein the display comprises a touch-sensitive display and the user interface event is associated with a user interaction with the touch-sensitive display.

13. The electronic device of claim 10, wherein the user interface event is associated with a change in the user interface.

14. The electronic device of claim 10, wherein the user interface event is associated with receiving a message.

15. The electronic device of claim 10, wherein the processor is further configured to determine an alternate haptic feedback signal to output in place of the haptic feedback signal.

16. The electronic device of claim 10, wherein the haptic feedback signal comprises a first haptic feedback signal and further comprising prioritizing a second haptic feedback signal over the first haptic feedback signal.

17. The electronic device of claim 10, wherein the haptic feedback signal comprises a first haptic feedback signal and wherein determining whether to output the haptic feedback signal to a haptic output device comprises:
   determining a second haptic feedback signal associated with the first haptic feedback signal; and
   outputting the second haptic feedback signal to the haptic output device.

18. The electronic device of claim 10, wherein the haptic feedback rate further comprises one or more of: a VSync rate, an audio sampling rate, a determination based at least in part on a measure of CPU utilization, a determination based at least in part on a timer, a determination based at least in part on a data transfer rate, and a determination based at least in part on the resolution of the display.

19. A non-transient computer readable medium comprising program code, which when executed by a processor, is configured to cause the processor to:
   receive an input signal associated with a user interface event;
   determine a haptic feedback signal based at least in part on the input signal; and
   determine whether to output the haptic feedback signal to a haptic output device based at least in part on a haptic feedback rate, wherein the haptic feedback rate comprises a periodic synchronization signal.

20. The non-transient computer readable medium of claim 19, further comprising program code, which when executed by a processor, is configured to cause the processor to output the haptic feedback signal to the haptic output device.

* * * * *